April 14, 1959 S. M. SILVER 2,881,961
METERED DISPENSING CARTON OR THE LIKE
Filed Nov. 26, 1956 2 Sheets-Sheet 1

INVENTOR.
STAN M. SILVER
BY
ATTY.

April 14, 1959 S. M. SILVER 2,881,961
METERED DISPENSING CARTON OR THE LIKE
Filed Nov. 26, 1956 2 Sheets-Sheet 2

INVENTOR.
STAN M. SILVER
BY
ATT'Y.

United States Patent Office 2,881,961
Patented Apr. 14, 1959

2,881,961

METERED DISPENSING CARTON OR THE LIKE

Stan M. Silver, New York, N.Y.

Application November 26, 1956, Serial No. 624,391

6 Claims. (Cl. 222—455)

The present invention relates to metered dispensing containers such as cartons, or the like, particularly adapted for use in dispensing metered quantities of free-flowing, granular or powdered solids, and is, in certain respects, an adaptation and extension of my invention for similar devices covered in my copending application, Serial No. 597,249, filed July 11, 1956, now Patent No. 2,801,033 issued July 30, 1957; and Serial No. 604,543, filed August 16, 1956, now Patent No. 2,801,034 issued July 30, 1957.

In my said copending applications I have described and claimed metered dispensing containers, particularly cartons, for free flowing granular or powdered dry solids, characterized by having their interior divided into four compartments, including a metering chamber in a lower corner of the container, a chute directly above the metering chamber and in direct communication therewith, and a loading or supply chamber directly alongside of the chute and above the metering chamber and likewise communicating with the upper end of the latter through a relatively narrow slot formed alongside the outlet into the chute. In said containers or cartons, the chute is formed to be of lesser capacity than the metering chamber and the loading or supply chamber of greater capacity than the metering chamber; the supply chamber is shown as being filled from the remainder of the carton interior through an opening formed in its bottom into which a one way valve is set.

It is believed that by the foregoing arrangement of metering chamber and loading or supply chamber and chute, the material in the metering chamber remains in contact with the material in the loading chamber through the communicating opening between them from the time the metering chamber is filled to the time the carton is inverted for discharge, to thereby keep the communicating opening filled during all of that time and prevent the flow or interchange of material between the metering chamber and supply chamber during the dispensing operation and thereby assure accurate and uniform metered dispensing.

While the metered dispensing containers of my said copending applications have been found highly effective and useful in successively dispensing accurate and uniform metered quantities of material, their greatest usefulness has been found in the dispensing of larger metered quantities, such as are measured in ounces, as for the measuring of soap flakes or powders, and have not been found as useful or convenient in the dispensing of smaller metered quantities, such as are measured in teaspoons or tablespoons, as in the case of certain types of food solids, as infants' foods, powdered coffee, or the like, or certain medicinal substances.

The present invention is, therefore, directed to the provision of metered dispensing containers or cartons particularly adapted for the dispensing of small metered quantities of free flowing, granulated or powdered dry solids.

It is an object of the present invention to provide metered dispensing containers of the character described which will successively, accurately and uniformly dispense small quantities of such free flowing, granulated or powdered dry solid materials.

It is also an object of the present invention to provide metered dispensing containers of the character described which are of highly simplified construction which may be formed with the use of a minimum of additional material over and above that required for similar non-metering containers.

It is another object of the present invention to provide metered dispensing containers of the character described that may be simply and easily assembled by standard methods and equipment and with a minimum of use of any special or complicated or costly apparatus.

It is a further object of the present invention to provide metered dispensing cartons of the character described that may be set up on and by the same apparatus used in the setting up of similar, non-metering cartons.

It is a still further object of the present invention to provide metered dispensing cartons or containers of the character described which may be filled by the same apparatus used in the filling of similar, non-metering containers or cartons.

It is yet a further object of the present invention to provide metered dispensing containers of the character described which are sturdy and strong, sure in their operation and simple and easy for the consumer to use.

The foregoing and other objects and advantages of the metered dispensing containers or cartons of the present invention will become more readily apparent to those skilled in the art from the embodiment thereof shown in the accompanying drawing and from the description following. It is to be understood, however, that such embodiment is shown by way of illustration only, to make the principles and practice of the invention more readily comprehensible, and without any intent of limiting the invention to the specific details therein shown.

Figure 1:
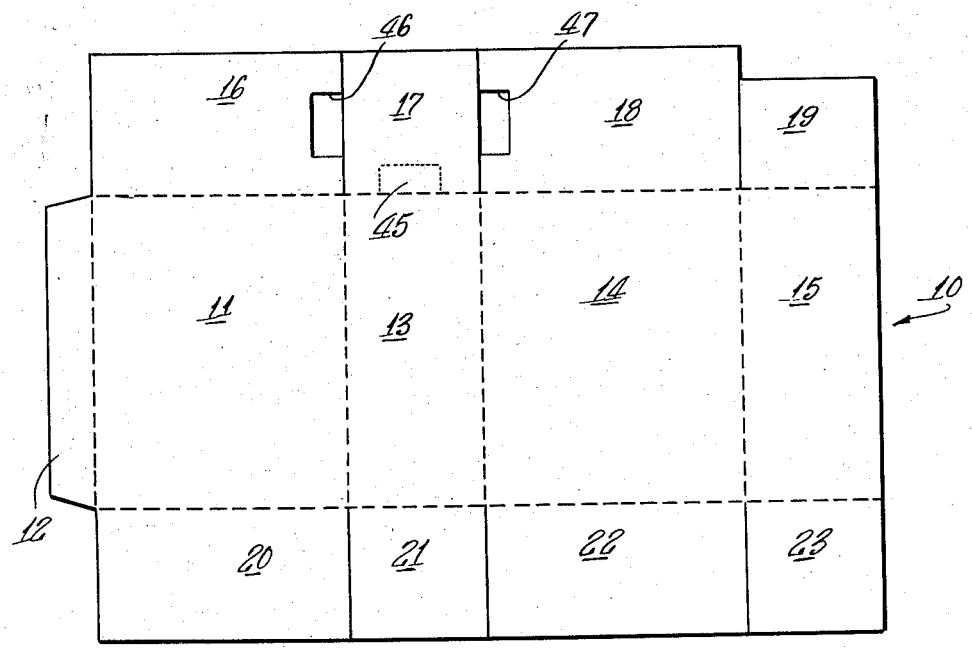
Fig. 1 is a plan view of a cardboard blank for forming the exterior of a carton embodying the present invention.
Figure 3:
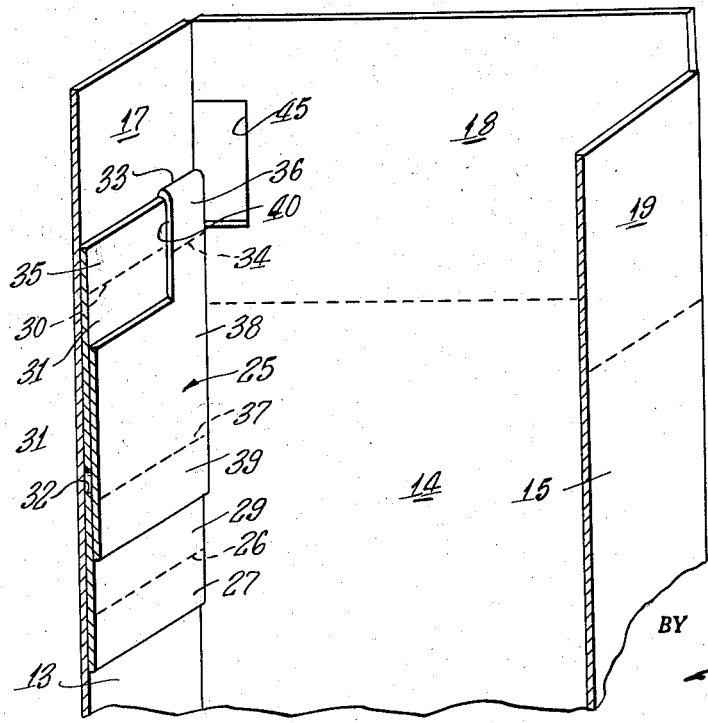
Fig. 3 is an enlarged, fragmentary vertical sectional perspective view through the assembled and partly set up carton of the invention; showing its position before its top is closed.
Figure 2:
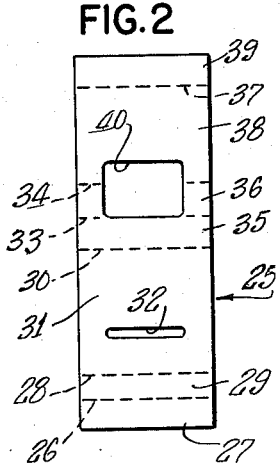
Fig. 2 is a plan view of an insert for assembly with said carton blank to provide the metering interior structure of the carton.

Generally stated, the present invention is an adaptation of the principle of the invention of my said copending applications, differing therefrom, however, in structural detail. Thus, the present invention also utilizes, in connection with a conventional container or carton, a one-piece insert which divides the carton interior into the equivalent of four compartments, including a chute, metering chamber and delivery or supply chamber; the latter being of larger size than the metering chamber and being disposed alongside of the chute and above the metering chamber and feeding into the metering chamber through a common slot at the top of the latter and the bottom of the supply chamber.

The communicating slot is formed in a horizontal plane and is so positioned that it is at all times, when the carton is in upright position and while it is being moved for inverting to dispensing position, filled with the material in the metering chamber which remains in contact with the material in the delivery or supply chamber, so as to prevent interchange of material between the two chambers during the inverting movement, and assure accurate and uniform metered dispensing.

The metered dispensing container of the present invention, however, differs from the invention of my said copending applications in that the metering chamber is not formed in a lower corner but in an upper portion of the container or carton and is wholly coextensive with the chute; in having the communicating opening between the supply chamber and metering chamber formed in a vertical plane rather than in a horizontal or transverse plane; and in having the opening into the delivery or supply chamber formed in an upper portion thereof, rather than in its bottom, and without any valve. The container of the present invention differs further in the size, form and scoring of the partitioning insert, and in the manner of its attachment to the container body, or carton blank.

More specifically stated, the present invention, as illustrated in the drawings, wherein it is shown embodied in a carton, comprises a carton of generally conventional shape and form, comprised of a cardboard blank, generally designated as 10, of generally conventional cut, having the outer side wall, 11, provided with a gluing tab extension, 12, along its outer edge; the inner end wall, 13; the inner side wall, 14; and the outer end wall, 15. The side and end walls, 11, 13, 14 and 15, are each provided with an integral top wall forming flap, 16, 17, 18 19, respectively, and with a bottom wall forming flap, 20, 21, 22 and 23, respectively. The side and end walls are defined from one another and from their respective top and bottom flaps by scored or similarly formed fold lines, as indicated by the broken lines in the drawing.

The carton of the invention further comprises a cardboard insert, generally designated as 25, of a width equal to the width of an end wall of the carton and of relatively short length or height. The insert 25 is divided by a plurality of transversely extending, scored fold lines into a plurality of sections or panels, as follows:

A lowermost fold line, 26, parallel to the lower edge of the strip 25, defines a gluing tab, 27, at said strip end. A second, oppositely directed fold line, 28, a short distance above the fold line 26, defines a spacing panel, 29, between it and the fold line 26. A third fold line, 30, a substantial distance above the fold line 28, defines a relatively longer panel, 31, above panel 29, adapted to form the inner wall of a combined chute and metering chamber compartment; the panel 31 having a transversely extending, relatively narrow slot, 32, formed preferably in the lower portion thereof, whose upper edge generally defines the upper limit of the metering chamber, A pair of parallel, relatively closely spaced fold lines, 33 and 34, above the fold line 30, define a pair of adjacent relatively narrow panels, 35 and 36, respectively, adapted, together, to form the top wall portion of the supply chamber. Another fold line, 37, a substantial distance above fold line 34, defines a panel, 38, of substantial height, but preferably shorter than panel 31, and adapted to form the inner wall of a supply chamber, said fold line 37 also defining between it and the other edge of the strip 25, a relatively narrow gluing tab, 39, preferably equal to but not greater in height than the distance between the lower edge of the slot 32 and the fold line 28. The panel 36 is formed with an opening, 40, formed between its edges and extending preferably its entire height and partly into the adjacent portion of panel 38; said opening constituting the opening into the supply chamber of the carton. Fold lines 30, 33 and 34 are oriented for folding in the same direction as fold line 26, and fold line 37 is oriented for folding in the same direction as fold line 28.

In assembling the carton of the invention, the insert 25 is first folded flatly over on itself along the fold line 33, and the gluing tab 39 is secured adhesively to the panel 31, with its inner edge substantially even with the lower edge of slot 32. The flat folding of the insert may be readily effected if the distance from the lower edge of slot 32 to the fold line 33 is equal to the distance from fold line 33 to the fold line 37. The folded insert is then secured by its gluing tab 27 to the upper portion of an end wall of the carton blank 10, preferably to inner end wall 13 thereof, with the folded over portion facing outwardly and in position to have the folded over strip project partly above the end wall, a distance equal to the height of the spacing panel 29 plus the height of the panel 35. Thereafter the carton blank 10 is longitudinally folded into a flattened tubular shape and the gluing tab 12 adhesively secured to the outer edge portion of the outer end panel, 15, preferably to the inner face thereof. The edges of the so folded and glued blank 10 are then pressed toward one another to set up the folded carton into rectangular position. While in the last position, the top closure of the carton is formed by first moving and folding inwardly the top flaps 17 and 19 of the end walls 13 and 15, and thereafter infolding the top flaps 16 and 18 of the side walls 11 and 14, and adhesively securing the inner of the side wall top flaps to the top end wall flaps 17 and 19 below it and to the other top side wall flap above it.

Figure 4:
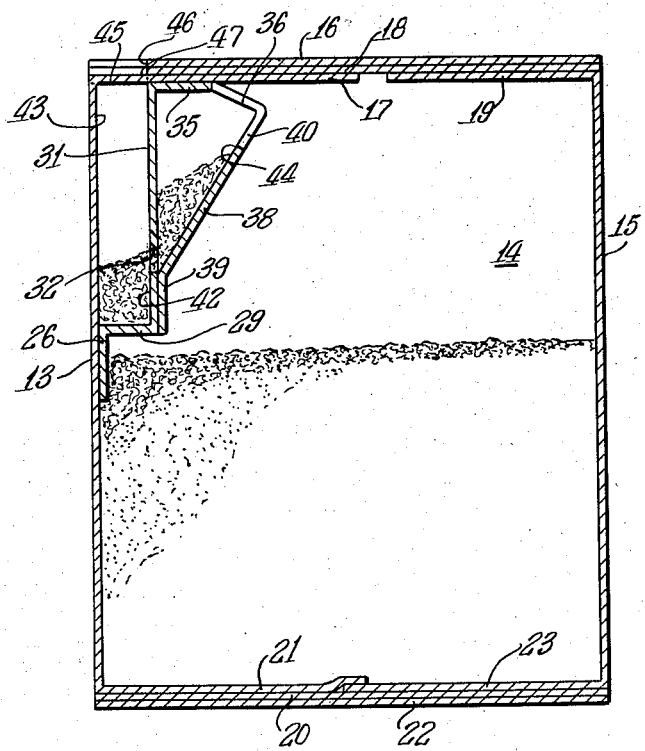
Fig. 4 is a vertical sectional view through a completely set up and filled and partly emptied carton of the present invention; shown in upright position.

It will be clear that, as the top flap 17 of the end wall 13, to which the partition strip 25 adhesively is secured, is inwardly folded, it will engage against the portion of the partition strip 25 projecting above the upper edge of the end wall 13, to gradually move and dispose panel 35 in horizontal position, even with the top of the adjacent side walls, and depress the panel 31 inwardly downwardly into the carton. The depressing of the panel 31 will cause the spacing panel 27 to be horizontally disposed to move the panel 31 into spaced, parallel relation to the end wall 13, and to form with such end wall, spacing panel 27 and adjacent portions of the side walls 11 and 14, an elongated, rectangular compartment that combines a lower, metering chamber, 42, and, coextensive therewith and above it, the chute 43; the upper end of the metering chamber being generally defined by the upper edge of the slot 32. The depressing of the panel 35 will tend to flatten the adjacent panel 36, which will cause the upper end of the panel 38, whose lower end is adhesively secured to the panel 31, to move away from said panel 31, to thereby spread and open up the supply or delivery chamber, 44, which will be of downwardly tapering, triangular shape along its portion below the panel 36; all as clearly shown in Fig. 4 of the drawings. To assure a leakproof arrangement of the metering structure, the panel 35 is preferably adhesively secured to the overlying top wall flap 17.

To assure successive, full and accurate metered dispensing, the supply chamber 44 is formed to have a substantially greater volume than the metering chamber, especially at the upper end thereof. This may be readily accomplished by the proper, predetermination of the dimensions of the critical parts of the partitioning insert 25; namely the heights of the several panels thereof and the position of the slot 32 in the panel 31.

After the carton has been set up and its top end closed, as described, which, as it will be readily apparent, may be done with the same apparatus and equipment used for the same purpose with similar conventional, non-metering cartons, the carton may be inverted and filled through its open bottom by conventional filling apparatus, and the bottom then closed and sealed, similarly by conventional apparatus.

Figure 5:
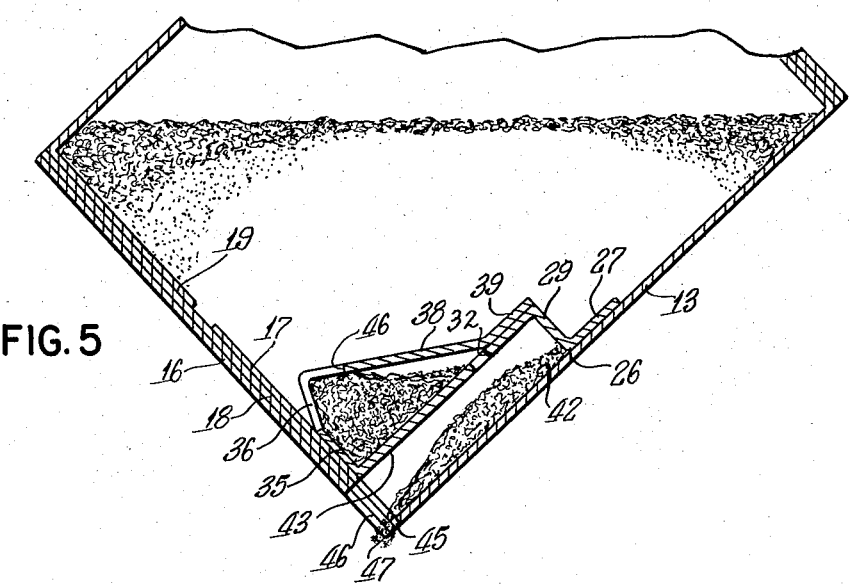
Fig. 5 is a similar, fragmentary view of the carton of Fig. 4, shown in dispensing position.

The metering operation of the container or carton of the invention will now become apparent. As the carton is filled through the bottom, a quantity of the material will fill the upper part of the delivery chamber 44. When the filled and sealed carton is uprighted, this material will flow downwardly in the supply chamber 44, and be directed by its sloping inner wall 38 to the slot 32, wherethrough it enters the metering chamber 43. Additional material in the full carton will also enter the supply chamber 44 of the uprighted carton through its opening 40, and will drop into the metering chamber 43, to assure its being filled to capacity or to the upper edge of the slot 32. At this point, the slot 32 is blocked or filled up by the material on each side thereof, below it in the metering chamber and above it in the supply chamber, to prevent any additional flow or interchange of material therethrough, while the carton is erect and also while it is being inverted for dispensing, until the critical point is reached where the material in the supply chamber drops away from the slot 32, by gravity, and the material in the metering chamber 43 is dispensed into and through the chute 42, as clearly shown in Fig. 5 of the drawings.

While the carton is in inverted position and after the carton is uprighted upon completion of the metered dispensing, the material in the corner of the carton adjacent the supply chamber opening 40 will flow into the supply chamber 44 and a portion of such material will again fill the metering chamber 43, in readiness for the next metered dispensing.

The carton of the present invention will, of course, be provided with an outlet, which may be formed in a wall portion of any part of the chute wall, but preferably in the top wall portion thereof, as illustrated in the drawing in a more or less diagrammatic manner; such outlet opening arrangement and formation not being critical to the present invention. Thus, the drawings show an outlet formed by a knock-out section, 45, defined in the top flap 17 of end wall 13, immediately above the chute 42, and openings 46 and 47 formed in the top flaps 16 and 18 of the side walls 11 and 14, arranged to register with the knockout portion 45 and to complete an outlet opening when the latter is torn away.

It may here be stated that the size of the slot 32 may be preferably made so as to provide a ready but not too rapid flow of material therethrough and may therefore be different for different materials, depending on their fluidity.

It may also be stated here that, while the present invention has been illustrated in connection with a carton, it may readily be adapted for use in connection with other types of rigid walled, closed containers or receptacles for solids, of different shapes and different materials.

This completes the description of the metered dispensing containers and cartons of the present invention and the methods of their assembly and use. It will be readily apparent that such cartons are especially adapted and highly suitable for use in dispensing small metered quantities of their contents though not limited thereto. It will also be apparent that the metered dispensing cartons of the present invention have highly simplified construction, involving the use of but a relatively small additional partition unit that may be easily and rapidly and economically assembled with the container proper, and that such containers may, therefore, be produced at relatively little advance in cost over similar, conventional, non-metering cartons. It will likewise be apparent that a metered dispensing carton of the present invention may be set up and filled with standard apparatus conventionally used for the purpose, and at the same rate as similar conventional cartons.

It will be further apparent that numerous variations and modifications of the metered dispensing containers and cartons of the present invention may be made by anyone skilled in the art, in accordance with the principles of the invention hereinabove set forth and without the exercise of any inventive ingenuity. I desire, therefore, to be protected for any and all such variations and modifications that may be made within the spirit of the present invention and the scope of the claims hereto appended.

What I claim is:

1. A metered dispensing container comprising, a carton of substantially rectangular shape and including top and bottom walls and upright side and end walls, and partitioning means within said carton comprising a strip of material of the width of one of the said upright walls, said strip folded to provide an attaching tab at one end whereby it is attached to one of the said upright walls, at a point intermediate its ends, a spacing panel immediately adjacent said attaching tab, an upright panel immediately adjacent said spacing panel and extending in spaced parallel relation to said upright wall to said top wall to define a first compartment, said upright panel having a slot formed therein in a lower portion thereof, a third panel at the upper end of said upright panel, disposed at substantially right angles to said upright panel inwardly into said carton against said top wall, an end panel connected to said third panel and extending downwardly into said carton in spaced relation to said upright panel, said end panel having its free end secured to said upright panel at a point substantially adjacent to and below the lower edge of said slot, to define a second compartment, said end panel having an inlet opening formed therein at its upper end, and outlet means for said carton formed in an upper outer wall portion of said first compartment.

2. The metered dispensing carton of claim 1, wherein said third panel is adhesively secured to said top wall.

3. The metered dispensing carton of claim 1, wherein said end panel converges downwardly towards said second panel.

4. The metered dispensing container of claim 1, wherein said end panel is connected to said third panel by an intermediate panel, said intermediate panel extending diagonally downwardly toward said end panel and said end panel converges downwardly toward said upright panel, and wherein said inlet opening extends into said intermediate panel.

5. The metered dispensing container of claim 1, wherein said second compartment is of greater capacity than the portion of said first compartment lying below the upper edge of said slot in said second panel.

6. The metered dispensing container of claim 1, wherein said end panel is connected to said third panel by an intermediate panel and the combined height of said end panel and said intermediate panel is substantially equal to the combined height of said third panel and the adjacent portion of said upright panel above the lower edge of said slot.

References Cited in the file of this patent

UNITED STATES PATENTS

| | | |
|---|---|---|
| 1,931,270 | Rice | Oct. 17, 1933 |
| 2,425,142 | Brubaker | Aug. 5, 1947 |